United States Patent [19]
Arnoldt

[11] Patent Number: 4,881,762
[45] Date of Patent: * Nov. 21, 1989

[54] DUCT CONNECTOR FOR A CIRCULAR DUCT

[75] Inventor: Peter J. Arnoldt, Clairton, Pa.

[73] Assignee: Ductmate Industries, Inc., Monongahela, Pa.

[ * ] Notice: The portion of the term of this patent subsequent to Sep. 19, 2006 has been disclaimed.

[21] Appl. No.: 205,305

[22] Filed: Jun. 10, 1988

[51] Int. Cl.$^4$ .............................................. F16L 23/00
[52] U.S. Cl. ..................... 285/367; 285/424
[58] Field of Search ................ 285/367, 331, 410, 424

[56] References Cited

U.S. PATENT DOCUMENTS

| | | | |
|---|---|---|---|
| 2,804,559 | 8/1957 | Brewer | 285/410 X |
| 2,862,231 | 12/1958 | Hedden et al. | 285/367 X |
| 2,880,017 | 3/1959 | Anderson et al. | 285/424 X |
| 3,415,543 | 12/1968 | Keating | 285/424 X |
| 4,516,797 | 5/1985 | Meinig | 285/424 X |
| 4,537,430 | 8/1985 | Sullivan | 285/424 X |
| 4,566,724 | 1/1986 | Arnoldt et al. | 285/424 X |
| 4,679,832 | 7/1987 | Meinig | 285/424 X |

Primary Examiner—Peter R. Brown
Attorney, Agent, or Firm—Stanley J. Price, Jr.

[57] ABSTRACT

A pair of frame members are secured to the ends of a pair of adjacent generally circular ducts. Each frame member includes a vertical wall extending upwardly from the circular duct and a sloped outer wall angularly spaced from the vertical wall. Each frame member includes an annular pocket for receiving an end of the circular duct, and a base wall abutting the annular pocket. The base wall has a rebent end portion for engaging a plurality of protuberances positioned on the inside wall of the circular duct. The frame members have an expanding means to urge the frame end portions away from each other to increase the diameter of the frame and engage the duct end portion. A gasket is positioned between the vertical walls of adjacent frame members to contact the adjacent vertical walls, and a clamp is positioned in surrounding relationship with the pair of adjacent frame members secured to the pair of adjacent circular ducts. The clamp has a pair of legs, each leg contacting a frame member sloped outer wall. The clamp includes tightening means for reducing the diameter of the clamp. As the tightening means is operated to reduce the diameter of the clamp, the clamp legs are moved in a direction towards the adjacent circular ducts to slide along the adjacent frame members sloped outer walls. As the legs are moved along the adjacent sloped outer walls, the pair of adjacent frame members are urged towards each other and into further contact with the gasket to provide an air-tight connection between the circular ducts.

19 Claims, 2 Drawing Sheets

DUCT CONNECTOR FOR A CIRCULAR DUCT

BACKGROUND OF THE INVENTION

1. Field of the Invention

This invention relates to a method and apparatus for connecting the ends of a pair of duct sections, and more particularly, to a duct joint frame assembly for connecting the ends of circular ducts that includes a pair of circular frame members each secured to an end portion of a circular duct and positioned to provide an airtight seal between the ends of the circular ducts as the frame members are urged together and into contact with a gasket positioned between the frame members.

2. Description of the Prior Art

It is well known to connect the ends of adjacent rectangular heating and air-conditioning ducts by a joint assembly secured to the ends of the adjacent duct members.

U.S. Pat. No. 3,415,543 discloses a hollow coupling frame for connecting a pair of rectangular duct sections. The frame includes a pair of reversely folded legs on one side thereof which define oppositely disposed channels for receipt of the sections to be joined. The legs end in angularly related laterally disposed locking lips, which extend back toward the legs to engage and lock the sections within the channels.

U.S. Pat. No. 3,630,549 discloses a duct joint connector for rectangular ducts which includes a rectangular inner frame positioned between adjacent rectangular ducts so that the duct ends abut the frame. The rectangular ducts are secured to the frame by means of external cleats. The corners of the rectangular frame are enclosed by end caps, and mastic may be pumped into the frame to seal air gaps between the ducts and the frame.

U.S. Pat. No. 4,046,409 discloses an arrangement for joining rectangular ventilation ducts. A first and second member are connected with a first duct end and a second duct end, respectively. The second member is provided with an upright stiffening leg and a horizontal leg terminated by a hook-shaped member, which can be snapped over a raised edge of the first member. The first member comprises a horizontal lip which is received by the second member.

U.S. Pat. No. 4,410,206 discloses a flange connection for rectangular air-conditioning ducts. The flange connection includes eight pieces of open-sided box girder, four of which are slipped onto and fixed to each of two rectangular ducts to form frames thereon. The two frames are then bolted together. Angle pieces are inserted into the frames at the corners and bolted to the frames to produce the desired sealing force between the frames.

U.S. Pat. No. 4,508,376 discloses a flange type duct joint assembly that includes a pair of frame members secured to the ends of adjacent rectangular ducts. The frame members have flange portions secured to each other by angular corner pieces having rearwardly curved or displaced flange portions operable to facilitate an air-tight seal between the ends of the duct sections and the frame members.

U.S. Pat. No. 4,509,778 discloses a duct joint assembly for sealingly connecting the ends of a pair of rectangular sheet metal duct sections that includes clamps for both connecting adjacent corner pieces which are part of the joint assembly and exerting sealing forces upon the corner pieces.

Assemblies for use in connecting the ends of rectangular ducts are also disclosed in the U.S. Pat. Nos. 4,542,923 and 4,558,892. The duct assemblies disclosed in these patents each include a plurality of individual frame members secured to the ends of adjacent rectangular ducts. Angular corner pieces are inserted into the ends of adjacent frame members, and the adjacent frame members on opposing duct ends are secured together by means of a clamp.

U.S. Pat. No. 4,566,724 discloses a duct joint frame for connecting rectangular duct sections that includes a plurality of flange members positioned oppositely of one another on the ends of the pair of generally rectangular ducts. Each flange member includes a stop arranged to engage a plurality of protuberances on the inner surface of the duct adjacent the duct end portion to prevent retraction of the duct end portion from the flange member. Angular corner pieces extend into the ends of the flange members to connect adjacent flange members and form a frame around the respective duct end portions.

Assemblies for connecting the ends of rectangular duct sections are also disclosed in West German Pat. Nos. 2,434,160 and 2,758,295. The assemblies disclosed in these patents each include a plurality of frame members which are slipped onto the ends of the opposing duct sections, and corner pieces which are inserted into the adjacent frame members on each duct. The corner pieces are bolted together to connect the adjacent duct sections.

Although the above listed patents each disclose apparatus for connecting generally rectangular duct sections, it is also known to provide apparatus for connecting the ends of generally circular duct sections.

U.S. Pat. No. 3,512,805 discloses a flexible strip for connecting the ends of generally circular ducts. The flexible strip includes a pair of longitudinal grooves adapted to receive the ends of the circular ducts therein. Protuberances on the outside surfaces of the circular ducts engage the longitudinal grooves to prevent retraction of the circular ducts from the strip after assembly.

U.S. Pat. No. 3,791,681 discloses a device for establishing a sealing connection between the ends of tubular members. The ends of the tubular members are bent outwardly, and a sealing member is positioned between the outwardly bent ends of the adjacent tubular members. A connecting strip having a substantially U-shaped cross section is forced over the outwardly bent ends of the tubular members to clamp the tubular member ends against the sealing member.

U.S. Pat. No. 4,418,948 discloses an elastic coupling for joining two pipes or tubes carrying a pressurized fluid. The coupling includes a plurality of elastic ring segments each having an annular cross section and a clamping collar. The pipes or tubes to be connected each include an outwardly extending rim or flange around the circumference of the edge of the pipe. The pipe flanges are arranged to receive the elastic ring segments. After the elastic ring segments are placed in surrounding relationship with the pipe flanges, the clamping collar is clamped down into contact with the ring segments causing the cross section of the ring segments to contract. As the ring segments contract, the pipe flanges are moved towards one another to compress a seal disposed intermediate the two flanges.

U.S. Pat. No. 4,516,797 discloses a flanged ring for connecting sheet metal tube sections. Each flanged ring includes a securing flange which protrudes radially outwardly from the tube section, an arm projecting from the inner end of the securing flange and a ring land bent obliquely outward from the arm toward the securing flange. The outer diameter of the ring land is selected such that when it is driven into the end of the tube, it is prestressed and thus produces a joint between the flanged ring and the tube. To connect a pair of sheet metal tube sections, a pair of flanged rings are secured to the ends of adjacent circular ducts, and the securing flanges of the adjacent flanged rings are fixed firmly to one another by means of a screw connection, clamp or the like. A German publication identified as "Metu System 61" illustrates a flange ring for connecting the ends of circular metal duct and is similar to the disclosure of U.S. Pat. No. 4,516,797. There is also a Canadian publication by Titan Steel Corporation which illustrates a similar product.

While it has been suggested by the prior art devices to connect a pair of adjacent rectangular duct sections or circular duct sections by means of a pair of frame members or the like, there is a need for an improved duct connector for connecting the ends of a pair of adjacent circular ducts in which the vertical walls of adjacent frame members connected to the circular ducts are urged together and into contact with a gasket member positioned between the adjacent frame members to provide an airtight seal between the duct sections joined.

SUMMARY OF THE INVENTION

In accordance with the present invention, there is provided a duct joint frame assembly for connecting the ends of generally circular ducts that includes a pair of circular frame members each connected to an end portion of a circular duct. Each frame member is formed from a thin walled material and includes a vertical wall portion which extends upwardly from the end of the circular duct. Stiffening means connected to each vertical portion provides rigidity to the vertical wall portions. Each frame member includes annular pocket means adjacent and generally perpendicular to the vertical wall portion. The annular pocket means has a configuration arranged to receive the end portion of a generally circular duct. After the pair of frame members are secured to the end portions of a pair of adjacent circular ducts, a gasket is positioned between the pair of adjacent frame members vertical wall portions to contact the pair of adjacent vertical wall portions. Means is also provided for urging the pair of adjacent vertical wall portions towards each other and into further contact with the gasket to provide a seal between the pair of frame members and duct sections.

Further in accordance with the present invention there is provided a circular duct joint frame for connection to the end portion of a generally circular duct in which the circumference of the circular duct frame is less than the circumference of the end portion of the circular duct which it is to be connected so that a gap is formed between the edges of the frame where it is positioned on the duct end portion. Means is provided to urge the edges of the frame away from each other after the duct frame is positioned on the duct end portion to increase the circumference of the frame and fixedly secure the frame on the end portion of the duct.

Additionally in accordance with the present invention there is provided a method for connecting the end portions of generally circular ducts by positioning a circular duct joint frame on an end portion of each of a pair of adjacent duct end portions. The duct joint frames have sloped outer wall portions. The duct joint frames are positioned in face to face relation with a circular gasket member therebetween. The adjacent sloped outer wall portions formed an included angle of the sum of the slope angles of each of the frames. A circular clamp is positioned around the duct joints frames and the circular clamp has a generally inverted V shape with the walls of the clamp having an angle less than the included angle of both of the frames. The clamp is tightened to urge the walls of the clamp angularly against the sloped outer walls of the duct joint frame to secure the duct joint frame and the duct end portions to each other and sealingly compress the circular gasket therebetween.

The invention also provides a method for connecting a duct joint frame to the end portion of a generally circular duct in which the generally circular frame member has an inturned wall and a leg member extending substantially parallel thereto to form an annular pocket therebetween. The circular frame is provided with a base wall positioned in under lying relation with the leg member and having a rebent end portion extending into the annular pocket. A circular end portion has a plurality of protuberances extending inwardly therefrom. The circular duct end portion is positioned in the duct frame annular pocket and the duct joint frame is connected to the circular duct by engaging the rebent end portion of the duct joint frame to the protuberences in the circular duct end portion. Additionally the method for connecting the duct joint frame to the end portion of a generally circular duct includes providing a generally circular frame member with an inturned wall and a base wall positioned in underlying spaced relation thereto and forming an annular pocket. The circular frame member has a circumferential dimension less than the circumferential dimension of the circular duct. The circular frame member has spaced end portions. The circular duct end portion is positioned in the duct frame annular pocket and thereafter the circular frame member end portions are urged away from each other to engage the circular frame to the duct end portions.

Accordingly, the principal object of the present invention is to connect a pair of adjacent circular ducts by means of a circular duct frame assembly that includes a pair of frame members each secured to a pair of adjacent circular duct end portions. The duct joint frame assembly includes a gasket positioned between the adjacent circular frame members and the pair of frame members are urged into contact with the gasket to provide a sealed connection between adjacent circular ducts.

Another object of the present invention is to provide a circular frame member having circumferential dimension less than the circumferential dimension of the circular duct positioned on an end of a circular duct and urged into engagement with the circular duct end to provide a sealed connection between the frame member and the end of the circular duct.

A further object of the present invention is to provide a method for connecting a duct joint frame member to the end of a generally circular duct in which a frame member is locked in place on the end of a circular duct and sealingly connected to the circular duct with sufficient rigidity to eliminate air leakage between the frame member and the circular duct without having to weld or bolt the frame member to the circular duct.

These and other objects of the present invention will be more completely disclosed and described in the following specification, the accompanying drawings and the appended claims.

DESCRIPTION OF THE PREFERRED EMBODIMENTS

Figures 1, 2, 3:
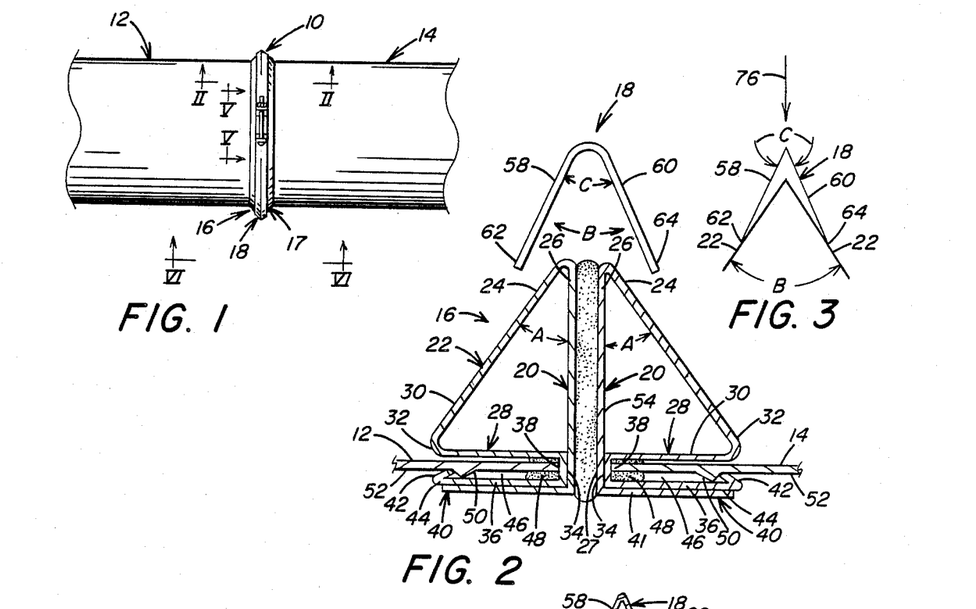
FIG. 1 is a top plan view of a pair of circular ducts connected by a duct joint frame assembly which is the subject of this invention.
FIG. 2 is a sectional view taken along line II—II in FIG. 1 illustrating a pair of frame members secured to a pair adjacent circular ducts and a clamp positioned above the pair of frame members with the gasket member compressed between the frame members.
FIG. 3 is a schematic illustration of the pinching action which takes place between a pair of adjacent frame members as a clamp is tightened around the pair of frame members.

Referring to the drawings, and particularly to FIG. 1, there is illustrated a duct joint frame assembly generally designated by the numeral 10 for connecting the ends of circular ducts 12, 14. Duct joint frame assembly 10 includes a pair of circular frame members generally designated by the numerals 16, 17 and a clamp 18. The end portions of the pair of ducts 12, 14 are secured to each other by the pair of frame members 16, 17 and clamp 18. A gasket (not shown in FIG. 1 but illustrated in substantially all other Figures) is disposed between the pair of frame members 16, 17, and the pair of frames 16, 17 are urged towards each other and into contact with the gasket by clamp 18 to sealingly connect the pair of circular ducts 12, 14 and prevent air leakage at the duct joint.

The frame members 16, 17 illustrated in the Figures have substantially the same configuration. The frame member 16, 17 are rolled from a flat piece of thin-gauge metal by a method well known in the art and have a longitudinal cross-sectional configuration as illustrated in FIG. 2.

Referring to FIG. 2, which is a sectional view taken along Line II—II in FIG. 1, there is illustrated a pair of frame members 16, 17 secured to a pair of adjacent circular ducts 12, 14. The construction of frame member 16 and its connection with circular duct 12 will be described herein, and it should be understood that the construction of frame member 17 and its connection to circular duct 14 will be identical.

Frame member 16 includes a vertical wall 20 that extends outwardly from the outer surface of circular duct 12 and a sloped outer wall 22. Sloped outer wall 22 is positioned to provide rigidity to and stiffen vertical wall 20. Sloped outer wall 22 has an end portion 24 connected to end portion 26 of vertical wall 20. As seen i FIG. 2, sloped outer wall 22 is angularly spaced from vertical wall 20, and the connection between sloped outer wall end portion 24 and vertical wall end portion 26 forms the vertex of an included angle A between sloped outer wall 22 and vertical wall 20. As will be explained later in greater detail, the pair of frame members 16, 17 secured to the ends of circular ducts 12, 14, respectively, each include a sloped outer wall 22 angularly spaced from vertical wall 20 by an included angle A so that the pair of frame members 16, 17 sloped outer walls 22 are angularly spaced from each other by an included angle B.

Frame member 16 also includes an inturned wall 28 having an end portion 30 connected to end portion 32 of sloped outer wall 22. As seen in FIG. 2, inturned wall 28 is substantially perpendicular to vertical wall 20. A depending shoulder 34, which is substantially parallel to and abutting vertical wall 20, connects inturned wall 28 with a leg section 36. Leg section 36 is maintained in spaced relation with inturned wall 28 by shoulder 34, and leg section 36 is substantially parallel to inturned wall section 28. Frame member 16 leg section 36 extends from shoulder section 34 rearwardly from circular duct 12 end portion 38.

Frame member 16 further includes a base wall section 40. Base wall 40 has an end portion 41 connected to vertical wall 20 end portion 27. Base wall 40 is substantially perpendicular to vertical wall 20 and includes a rebent end portion 42. As will be explained later in greater detail, frame member 16 rebent end portion 42 engages protuberances on the inside wall of circular duct 12 to maintain frame member 16 in assembled relation with circular duct 12. A portion of base wall 40 is in underlying, abutting relation to leg section 36. With this configuration, leg section 36 provides rigidity to base wall 40. In addition, the end portion 44 of leg section 36 is positioned between the rebent end portion 42 of base wall 40 and base wall 40 to further strengthen base wall 40.

Figure 6:
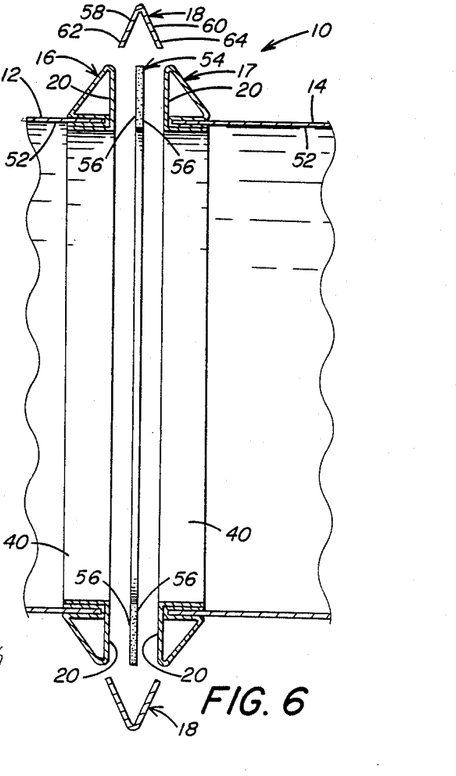
FIG. 6 is an enlarged, exploded sectional view of a pair of frame members secured to adjacent circular ducts, illustrating a gasket positioned between adjacent frame members and a clamp surrounding the adjacent frame members.

As seen in FIG. 2, and also in FIG. 6, frame member 16 inturned wall section 28, depending shoulder 34, and leg section 36 are arranged to form an annular pocket 46. Annular pocket 46 has a configuration to receive the end portion 38 of circular duct 12. Circular duct 12 end portion 38 is extended into frame member 16 annular pocket 46 into abutting relation with the depending shoulder 34 and a distance sufficient to allow the rebent end portion 42 of frame member 16 to engage the plurality of protuberances 50 on the inside wall 52 of circular duct 12.

The plurality of protuberances 50 positioned on the inside wall 52 of circular duct 12 are formed in a manner well known in the art. The plurality of protuberances 50 are each positioned on circular duct 12 inside wall 52 a fixed preselected distance from circular duct 12 end portion 38. The plurality of protuberances 50 are engaged by frame member 16 rebent end portion 42 to prevent retraction of circular duct 12 from annular pocket 46 after circular duct 12 is extended into annular pocket 46. As described, frame member 16 is secured to a circular duct 12 by extending circular duct 12 end portion 38 into annular pocket 46 and engaging frame member 16 rebent end portion 42 with the plurality of protuberances 50 formed on the inside wall 52 of circular duct 12. As frame member 16 is snapped in place on circular duct 12 end portion 38, the engagement of rebent end portion 42 with the plurality of protuberances 50 provides a sturdy connection between frame member 16 and circular duct 12.

It should be understood, however, the protuberance 50 and rebent portions 42 are additional means to engage the frame member to the circular duct. The frame member may, however, be fractionally engaged to the duct end portion and provide a sealed connection. The clamp member, as later discussed, connects the flanges to each other to form a sealed connection.

If desired, a suitable amount of mastic 48 may be placed in annular pocket 46 to provide a sealed connection between frame member 16 and circular duct 12. As seen in FIG. 2, mastic 48 is placed in annular pocket 46, and circular duct 12 is extended into frame member 16 annular pocket 46 until circular duct end portion 38 is embedded in the mastic 48 around the complete circumference of circular duct. Mastic 48 provides an airtight seal to further ensure that air passing through circular duct 12 does not escape through annular pocket 46 to atmosphere.

The above description of the configuration of frame member 16 and its connection to circular duct 12 also applies to the configuration of frame member 17 and its connection to circular duct 14. As previously described, frame members 16 and 17 have substantially identical configurations as illustrated in the Figures. Since frame members 16 and 17 have substantially identical configurations, the various components of frame member 17 have numeral designations corresponding to the same components of frame member 16.

As later discussed in detail, the frame members are described as having a generally circular configuration. It should be understood, however, although the frame members are circular, end portions of the frame members are spaced from each other and urged away from each other to engage the end of the circular duct.

Figures 7, 8, 9, 10:
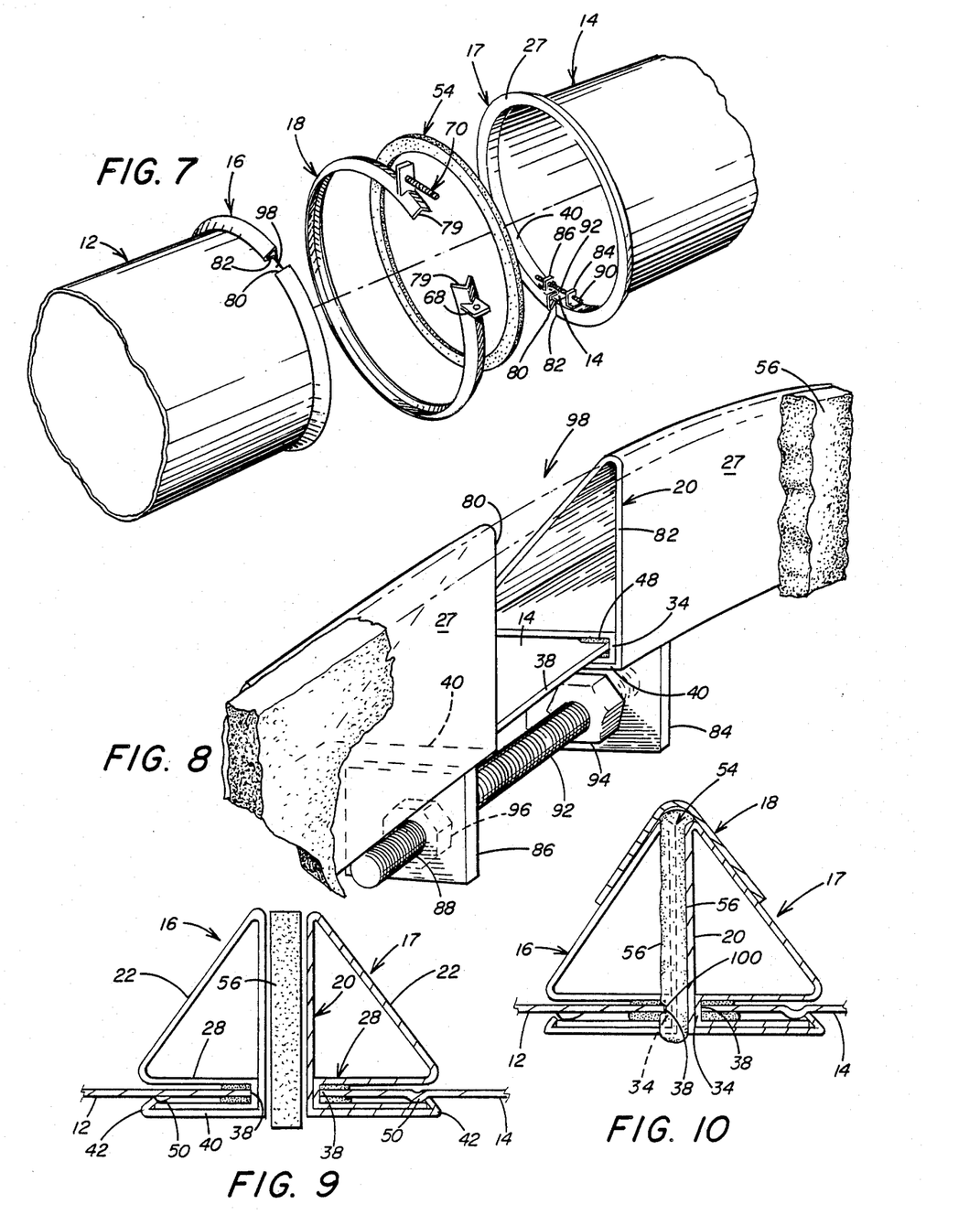
FIG. 7 is an exploded isometric view of a pair of circular duct end portions having frame members secured thereon and tensioned on the duct end portions by tensioning devices.
FIG. 8 is a fragmentary perspective view of the end portions of a frame connected to the end of a circular duct and secured thereon by an expansion device.
FIG. 9 is a view in section similar to FIG. 2 with the frame members spaced and the gasket in an expanded nonsealing condition.
FIG. 10 is a view in section similar to FIG. 9 taken at a location between the ends of one of the frame members and illustrating the exposed edge of the duct end portion sealingly embedded in the circular gasket.

Referring to FIGS. 7, 8 and 9, the duct frames 16 and 17 are of a circular configuration and have end portions 80 and 82 spaced from each other. Along the base wall 40 adjacent the edges 80 and 82 there are a pair of upstanding brackets 84 and 86. The brackets 84 and 86 are more clearly illustrated in FIG. 8 depending from the frame base wall 40. The brackets 84 and 86 may have angular leg portions (not shown) and are suitably secured to the frame base wall by means of welding or the like. The brackets have aligned apertures 88 and 90 through which a threaded bolt 92 extends. The bolt 92 is threaded throughout its length and has a pair of nuts 94 and 96 thread thereon. With the threaded bolt 92 associated nuts 94 and 96 and brackets 84 and 86 secured to the base wall of the frame member, it is now possible to increase the diameter of the circular frame member. Further, after the frame member is slidably positioned on the circular duct end portion 38, the bolt 92 and nuts 94 and 96 are utilized to increase the diameter of the frames 16 and 17 to thus sealingly urge the frame members into engagement with the circular duct end portion. The duct end portions have a fixed diameter and the frame members are urged in an expanding position into engagement with the duct end portions. Thus even if the ducts 12 and 14 have different diameters the frames 16 and 17 accomodate there differences and are expanded to engage these ducts.

The brackets and threaded bolt 92 serve an additional function, in that the circular ducts, as fabricated, will have diameters that will vary by a substantial amount. If the frame members have fixed diameter and do not have spaced end portions, as above described, frequently the duct frame members will be either too large or too small to fit on the fabricated duct because of the variation in the duct dimensions. The frame members with the above bolt 92 and bracket members are fabricated with a circumferential dimension that is less than the circumferential dimension of the duct. This frame dimension results in a space 98 between the ends of the frame. The bolt 92 and nuts 94 can be utilized to increase the effective circumference of the frames 16 and 17 and to further, as discussed above, clampingly urge the frames onto the duct end portions. This provides a versatile duct frame that can be used on circular duct with varying dimensions.

As illustrated in FIGS. 8 and 10, the duct 14 has an end portion 38 that is embedded in the mastic 48 in the pocket of the frame to seal the end portion 38 in the pocket. However, there is a gap in the mastic 48 between the end portions 80 and 82 of the respective frames because of the gap in the frames. The circular gasket 56, however, is positioned in abutting relation with the front face 27 of the frame vertical wall 20. The circular gasket extends across the gap 98 to fill the entire gap 98 and, as illustrated in FIG. 10, upon being compressed by the clamp assembly 18, later discussed, the end 38 of circular duct 14 is embedded in the face of the circular gasket 56 at 100, as illustrated in FIG. 10. Extending or embedding the circular duct end portion 14 in the circular gasket 56 effective seals the gap in the frame member 98 and in conjunction with the mastic 48 and the remaining portions of the circular gasket 56 provide an effective seal so that the end portions of the circular ducts are sealingly connected to each other. Preferably, the gaps in the adjacent frame members are arranged at different locations along the circumference of the circular ducts so that the gaps 98 in the frame members are not aligned. This is illustrated in FIGS. 7, 9 and 10 where the gap 98 appears in the frame member 16 opposite a continuous portion of the frame member 17. With this arrangement, the vertical wall 20 of frame member 17 provides a backing for the gasket 56 on the side opposite the location where the end of the circular duct 14 is embedded into the gasket 56.

Referring to FIGS. 2 and 6, there is illustrated a pair of frame members 16, 17 positioned on the ends of a pair of adjacent circular ducts 12, 14. A gasket 54 is positioned between the pair of adjacent frame members 16, 17 so that the outside surfaces 56 of gasket 54 contact the adjacent frame members 16, 17 vertical walls 20. Although FIG. 6 is an exploded view of frame members 16, 17 connected to adjacent circular ducts 12, 14, it should be understood that upon assembly, the outside surfaces 56 of gasket 54 abut the vertical walls 20 of frame members 16, 17.

Figure 4:
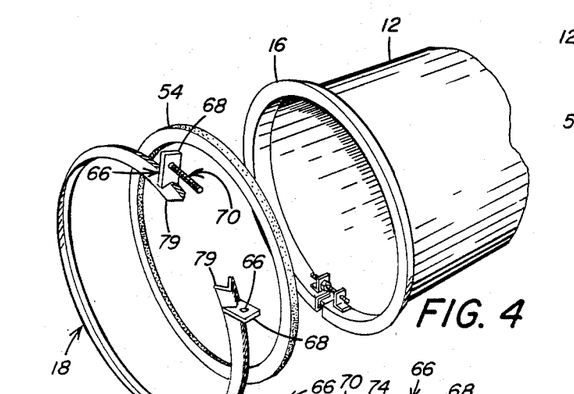
FIG. 4 is an exploded, isometric view of a frame member including an expansion device for the frame member, a gasket for use between adjacent frame members, and a circular clamp to sealingly connect adjacent frame members.

In order to sealingly connect adjacent frame members 16, 17 to each other and thereby sealingly connect adjacent circular ducts 12, 14, a clamp such as clamp 18 illustrated in FIGS. 2 and 4 is utilized. Clamp 18 has a generally circular configuration, and is preferably made from a thin-walled metallic material. Clamp 18 includes a first leg 58 and a second leg 60. As seen in FIG. 2, first and second legs 58, 60 are angularly spaced from each other by an included angle C. The circumference of clamp 18 is split to facilitate positioning clamp 18 around the pair of adjacent frame members 16, 17 after the frame members are secured to circular ducts 12, 14.

Figure 5:
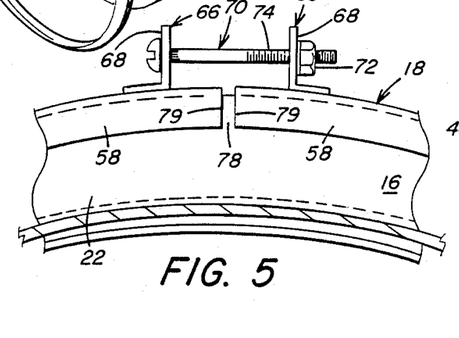
FIG. 5 is a partial sectional view taken along line V—V in FIG. 1 illustrating the circular clamp tightening assembly.

As further illustrated in FIG. 5, clamp 18 includes a pair of generally L-shaped brackets 66. One L-shaped bracket 66 is secured to the outer surface of clamp 18 on each side of the circumferential split 78 in clamp 18. The pair of generally L-shaped brackets 66 each have an opening completely through their respective upstanding leg portions 68 for receiving a bolt 70 having a threaded portion 74 for threadedly engaging a nut 72. As will be explained later in greater detail, after clamp 18 is positioned around the pair of adjacent frame members 16, 17 secured to circular ducts 12, 14, nut 72 is tightened on threaded portion 74 to urge the pair of L-shaped brackets towards each other to reduce the width of split 78 and thereby reduce the diameter of circular clamp 18. As the diameter of circular clamp 18 is reduced, the pair of adjacent frame members 16, 17 secured to adjacent circular ducts 12, 14 are urged into further contact with gasket 54 to provide an air-tight connection between circular ducts 12, 14.

To assemble duct joint frame assembly 10, clamp 18 is positioned to completely surround the pair of adjacent frame members 16, 17 secured to adjacent circular ducts 12, 14. FIG. 2 illustrates a sectional view of clamp 18 positioned above the pair of adjacent frame members 16, 17 to better illustrate the relationship between clamp 18 and adjacent frame members 16, 17 as will be herein described.

As previously described and illustrated in FIG. 6, circular clamp 18 includes a first leg 58 and a second leg 60, and is constructed and arranged to provide that first leg 58 is angularly spaced from second leg 60 by an included angle C. The pair of adjacent frame members 16, 17 sloped outer walls 22 are angularly spaced from their respective vertical walls 20 by an included angle A so that the sloped outer walls 22 between adjacent frame members 16, 17 form an included angle B. As seen in FIG. 2, and more particularly in FIG. 3, the included angle C between circular clamp 18 first leg 58 and second leg 60 is less than the included angle B between adjacent frame members 16, 17 sloped outer walls 22.

In order to clamp adjacent frame members 16, 17 together and thereby sealingly connect adjacent circular ducts 12, 14, first leg 58 end portion 62 is brought into contact with frame member 16 sloped outer wall 22, and second leg 60 end portion 64 is brought into contact with frame member 17 sloped outer wall 22. This is accomplished by inserting bolt 70 illustrated in FIGS. 4 and 5 through the pair of openings 65 in the upstanding legs 68 of the generally L-shaped brackets 66 positioned on each side of the split 78 in the circumference of clamp 18. As nut 72 is thereafter tightened on the threaded portion 74 of bolt 70, the upstanding brackets 66 are drawn together by this tightening action to reduce the width of gap 78 and thereby urge the facing end portions 79 of clamp 18 closer together. As the facing end portions 79 are urged closer together, the overall diameter of circular clamp 18 is reduced to allow the end portions 62, 64 of first and second legs 58, 60, respectively to contact the sloped outer walls 22 of adjacent frame members 16, 17.

Continued tightening of nut 72 on bolt 70 urges the end portions 62, 64 of legs 58, 60 into further contact with the sloped outer walls 22 of adjacent frame members 16, 17. This causes a pinching effect which results in the adjacent frame members 16, 17 being urged together so that the adjacent vertical walls 20 of frame members 16, 17 compress gasket 54 in the area of the adjacent vertical walls end portions 26. This compressing action seals the adjacent frame members 16, 17 in gasket 54 to prevent air passing between circular ducts 12, 14 from escaping between the adjacent frame members 16, 17 vertical walls 20.

A schematic illustration of the sealing action which takes place as circular clamp 18 is tightened on frame members 16, 17 is illustrated in FIG. 3. As seen in FIG. 3, clamp 18 is positioned around adjacent frame members 16, 17 to permit first leg 58 end portion 62 to abut the surface of frame member 16 sloped outer wall 22 and second leg 60 end portion 64 to abut the surface of frame member 17 sloped outer wall 22. As nut 72 is tightened on threaded portion 74 of bolt 70, the diameter of clamp 18 is reduced. As the diameter of circular clamp 18 is reduced, both first leg 58 end portion 62 and second leg 60 end portion 64 are urged into contact with the sloped outer walls 22 of adjacent frame members 16, 17. As nut 72 is further tightened on threaded portion 74 of bolt 70, an increased force illustrated by the directional arrow 76 resulting from the reduction in diameter of clamp 18 is applied to adjacent outer walls 22 by first leg 58 end portion 62 and second leg 60 end portion 64. Since the pair of adjacent frame members 16, 17 are separated by compressible gasket 54, as an increased force is applied to the adjacent sloped outer walls 22 due to the reduction in diameter of clamp 18, the pair of sloped outer walls 22 are pinched together resulting in a compression of gasket 54 by the vertical walls 20 of adjacent frame members 16, 17.

This pinching action takes place since the included angle C between circular clamp 18 first leg 58 and second leg 60 is less than the included angle B between the sloped outer walls 22 of adjacent frame members 16, 17. Since angle C is less than angle B, the reduction in the diameter of clamp 18 causes the end portion 62 of first leg 58 to move downwardly along the outer surface of frame member 16 sloped outer wall 22 and the end portion 64 of second leg 60 to move downwardly along the outer surface of frame member 17 sloped outer wall 22 and thereby pinch the sloped outer wall 22 of adjacent frame members 16, 17 between the first and second legs 58, 60. As the adjacent sloped outer walls 22 are pinched together, the adjacent frame members 16, 17 vertical walls 20 compress gasket 54 to provide an air-tight seal between frame members 16 and 17.

As described, a pair of circular ducts such as circular ducts 12, 14 may be secured to each other by the pair of frame members 16, 17, gasket 54 and clamp 18. First the frame members are urged against the end portion of the circular duct by the bolt 92 and nuts 94 and 96 and then as clamp 18 is tightened around the pair of adjacent frame members 16, 17, the frame members 16, 17 are urged together to compress gasket 54 and thereby seal the adjacent frame members 16, 17 to prevent air passing through circular ducts 12, 14 from escaping between the pair of adjacent frame members 16, 17. The rigidified frame members secured to the circular duct end portion provide a rigid base for the clamp 18 to compress the gasket 54.

According to the provisions of the Patent Statutes, I have explained the principal, preferred construction and mode of operation of my invention and have illustrated and described what I now consider to represent its best embodiments. However, it should be understood that, within the scope of the appended claims, the invention may be practiced otherwise than as specifically illustrated and described herein.

I claim:

1. A duct joint frame assembly for connecting the end portions of generally circular ducts comprising,
   a pair of circular frame members each having spaced end portions, each said frame member connected to an end portion of a circular duct and having a gap formed between said end portions,
   each said frame member having a vertical wall portion extending upwardly from said circular duct end portion, said vertical wall having a bottom portion and a top portion,
   stiffening means connected to each said frame member vertical wall portion at said vertical wall top portion, said stiffening means extending rearwardly away from said vertical wall portion,
   said stiffening means forming an annular pocket means for receiving said circular duct end portion,
   a portion of each of said duct end portions arranged to extend into said gap to a location adjacent said frame member vertical wall portion,
   gasket means positioned between a pair of adjacent frame members vertical wall portions, said gasket means arranged to contact said pair of adjacent vertical wall portions, and
   means for urging said pair of adjacent vertical wall portions towards each other and into further contact with said gasket means to provide a seal between said pair of adjacent vertical wall portions and between said gasket and said portions of said duct end portions in said gaps.

2. A duct joint frame assembly for connecting the end portions of generally circular ducts as set forth in claim 1 in which each said frame member stiffening means includes,
   a sloped outer wall portion connected to said vertical wall portion to stiffen said vertical wall portion,
   said sloped outer wall portion angularly spaced from said vertical wall portion and extending rearwardly from said circular duct end portion,
   an inturned wall portion connected to said sloped outer wall portion, said inturned wall portion extending from an end portion of said sloped outer wall portion towards said circular duct end portion,
   a leg portion spaced from said inturned wall portion and extending rearwardly from said circular duct end portion, an end of said leg portion being connected to an end of said inturned wall portion by a shoulder portion, and
   said inturned wall portion, said shoulder portion and said leg portion forming said annular pocket means for receiving said circular duct end portion.

3. A duct joint frame assembly for connecting the end portions of generally circular ducts as set forth in claim 2 in which each said frame member includes,
   a base wall portion having an end portion connected to said vertical wall portion and an opposite end portion having a rebent portion, a portion of said base wall portion in underlying relation to said leg portion, and
   said rebent end portion extending into said annular pocket means and arranged to engage protuberances positioned on the inside wall of said circular duct adjacent said circular duct end portion to prevent retraction of said circular duct from said annular pocket means.

4. A duct joint frame assembly for connecting the end portions of generally circular ducts as set forth in claim 3 which,
   said leg portion contacts said base wall portion to structurally reinforce said base wall portion.

5. A duct joint frame assembly for connecting the end portions of generally circular ducts as set forth in claim 1 which includes,
   clamping means having a generally circular configuration, said clamping means including a first leg having an end portion and a second leg having an end portion,
   said clamping means arranged to surround said pair of frame members secured to a pair of adjacent circular duct end portions so that said first leg end portion contacts said sloped outer wall portion of one said frame member and said second leg end portion contacts said sloped outer wall portion of the adjacent frame member,
   said clamping means including means for moving said first and said second leg end portions in a direction towards said adjacent circular ducts along said sloped outer wall portions, and
   said movement of said first and said second leg end portions urging said pair of adjacent vertical wall portions towards each other and into further contact with said gasket means to provide said seal between said pair of adjacent vertical wall portions.

6. A duct joint frame assembly for connecting the end portions of generally circular ducts as set forth in claim 4 in which,
   said pair of adjacent frame members are secured to said pair of adjacent circular duct end portions to provide a first preselected angle between said adjacent frame members sloped outer wall portions,
   said clamping means first and second legs are connected in a generally inverted V-shaped configuration with said first leg angularly spaced from said second leg by a second preselected angle, and
   said first preselected angle is greater than said second preselected angle.

7. A duct joint frame assembly for connecting the end portions of generally circular ducts as set forth in claim 1 which includes,
   sealant means positioned in said annular pocket means for sealingly connecting said circular duct end portion to said frame member.

8. A circular duct joint frame for connection to the end portion of a generally circular duct comprising,
   a vertical wall portion having a generally annular configuration, said vertical wall portion having a bottom portion and a top portion, a stiffening means including a flange member extending generally perpendicularly from said vertical wall portion for stiffening said vertical wall portion, said flange member arranged to be positioned in underlying relation with an end portion of a generally circular duct, said duct joint frame arranged to be secured to an end portion of a generally circular duct, said duct joint frame having spaced end portions arranged to form a gap therebetween with a portion of said circular duct end portion extending into said gap, and means to provide a seal between said duct extending into said gap and said duct joint frame.

9. A circular duct joint frame for connection to the end portion of a generally circular duct as set forth in claim 8 in which said stiffening means includes, a sloped outer wall portion connected to said vertical wall top portion and being angularly spaced from said vertical wall portion to stiffen said vertical wall portion, an inturned wall portion connected to said sloped outer wall portion, said inturned wall portion extending from said sloped outer wall portion towards said vertical wall portion, said inturned wall portion substantially perpendicular to said vertical wall portion, a leg portion substantially parallel to and spaced from said inturned wall portion, an end of said leg portion connected to an end of said inturned wall portion by a shoulder portion, said inturned wall portion, said leg portion and said shoulder portion forming an annular pocket means, and said annular pocket means arranged to receive an end portion of a generally circular duct.

10. A circular duct joint frame for connection to the end portion of a generally circular duct as set forth in claim 9 which includes, a base wall portion having an end portion connected to said vertical wall portion and an opposite end portion having a rebent portion, a portion of said base wall portion in underlying relation to said leg portion, and said rebent end portion arranged to extend into said annular pocket means to engage protuberences positioned on an inside wall of said circular duct to prevent retraction of said circular duct from said annular pocket means after an end of said circular duct is inserted into said annular pocket means.

11. A circular duct joint frame for connection to the end portion of a generally circular duct as set forth in claim 8 in which, connector means connecting the end portions of said spaced frame and arranged to change the distance between said end portions of said duct joint frame.

12. A circular duct joint frame for connection to the end portion of a generally circular duct as set forth in claim 11 in which, said connector means arranged to move said end portions away from each other.

13. A circular duct joint frame for connection to the end portion of a generally circular duct as set forth in claim 11 in which, said connector means arranged to increase the circumference of said frame.

14. A circular duct joint frame for connection to the end portion of a generally circular duct as set forth in claim 11 in which, said frame having a diameter less than the diameter of said duct end portion, and said connector means arranged to increase the diameter of said frame member.

15. A method for connecting the end portions of generally circular ducts comprising the steps of, positioning a circular duct joint frame on an end portion of each of a pair of adjacent duct end portions, said duct joint frames having spaced end portions and sloped outer wall portions, said circular duct joint frame and said circular duct being dimensioned to form a gap between said duct joint frame end portions, portions of said duct end portions extending into said gap, positioning said duct joint frames in face to face relation with a circular gasket member therebetween, said adjacent sloped outer wall portions forming an included angle of the sum of the sloped angles of each of said frames, positioning a circular clamp around said duct joint frames, said circular clamp having a generally inverted v shape with the walls of the clamp having an angle less than the included angle of both of said frames, tightening said clamp and urging the walls of said clamps angularly against the sloped outer walls of said duct joint frames to secure said duct joint frames and duct end portions to each other and sealingly compress a circular gasket therebetween and into said gaps in sealing relation with said portions of said duct end portions extending into said gaps.

16. A method for connecting a duct joint frame to the end portion of a generally circular duct as set forth in claim 15 which includes, providing said generally circular frame member with an inturned wall extending from the bottom portion of said sloped outer wall portion and a leg member extending from the bottom portion of the vertical wall portion of said frame member, said leg member extending substantially parallel to and spaced from said inturned wall to form an annular pocket therebetween, providing said circular frame with a base wall positioned in underlying relation with said leg member and having a rebent end portion extending into said annular pocket, positioning a circular duct end portion with a plurality of protuberances extending inwardly therefrom in said duct frame annular pocket, and connecting said duct joint frame with said circular duct by engaging said rebent end portion of said duct joint frame to said protuberances in said circular duct end portion.

17. A method for connecting a duct joint frame to the end portion of a generally circular duct comprising the steps of, providing a generally circular frame member with an inturned wall extending inwardly from the bottom portion of a sloped outer wall and a base wall extending outwardly from the bottom portion of a vertical wall, said sloped outer wall connected to the top portion of said vertical wall, said base wall positioned in underlying spaced relation with said inturned wall and forming an annular pocket, said circular frame member having a circumferential dimension less than the circumferential dimension of said circular duct, said circular frame member having spaced end portions, positioning a circular duct end portion in said duct frame annular pocket, and thereafter urging said circular frame member end portions away from each other to engage said circular frame member to said duct end portion and form a gap between said spaced end portions with a portion of said circular duct end portion extending into said gap.

18. A method for connecting a duct joint frame to the end portion of a generally circular duct as set forth in claim 17 which includes, moving said end portions of said circular frame member relative to each other to engage said circular frame member to said duct end portion.

19. A method for connecting a duct joint frame to the end portion of generally circular duct as set forth in claim 17 which includes, moving said end portions of said circular frame member away from each other to urge said circular frame member against said circular duct end portion and engage said frame member to said duct end portion.

* * * * *